United States Patent [19]

Moll et al.

[11] 4,009,286

[45] Feb. 22, 1977

[54] CONTINUOUS PRODUCTION OF FERMENTED LIQUIDS

[75] Inventors: Manfred Moll, Vandoeuvre; Gilbert Durand, Toulouse; Henri Blachere, Talant, all of France

[73] Assignee: Groupement d'Interet Economique, France

[22] Filed: July 1, 1974

[21] Appl. No.: 484,868

[30] Foreign Application Priority Data

Oct. 19, 1973  France ............................ 73.38385

[52] U.S. Cl. .................................. 426/13; 99/276; 195/68; 195/74; 195/115; 195/116; 426/16; 426/521

[51] Int. Cl.$^2$ ................. C12C 11/04; C12C 11/12; C12C 11/14

[58] Field of Search ............... 426/16, 11, 13, 521; 195/116, 68, 57, 74, 121, 115; 99/276

[56] References Cited

UNITED STATES PATENTS

| | | | |
|---|---|---|---|
| 3,402,103 | 9/1968 | Amberg et al. | 195/116 |
| 3,524,402 | 8/1970 | Bosewitz et al. | 426/16 X |
| 3,875,303 | 4/1975 | Hieber | 426/16 |

OTHER PUBLICATIONS

De Clark, J., A Textbook of Brewing, Chapman & Hall, Ltd., London, vol. 1, 1957 (pp. 424–426, 445 and 446).

*Primary Examiner*—David M. Naff
*Attorney, Agent, or Firm*—Robert E. Burns; Emmanuel J. Lobato; Bruce L. Adams

[57] ABSTRACT

Production of fermented liquids such as beer is continuously carried out under sterile conditions by flash sterilizing a mixture of wort and bitter substances by direct steam injection, boiling the mixture to complete transformation of bitter substances incorporated in the wort, decanting a precipitate formed in the wort under aeration of the wort by sterile air or oxygen, fermenting the wort by bringing the wort under sterile conditions into contact with yeast immobilized on an inert support, storing the fermented wort in the presence of yeast under sterile conditions and passing the fermented wort under sterile conditions into contact with a protease fixed on a support.

13 Claims, 1 Drawing Figure

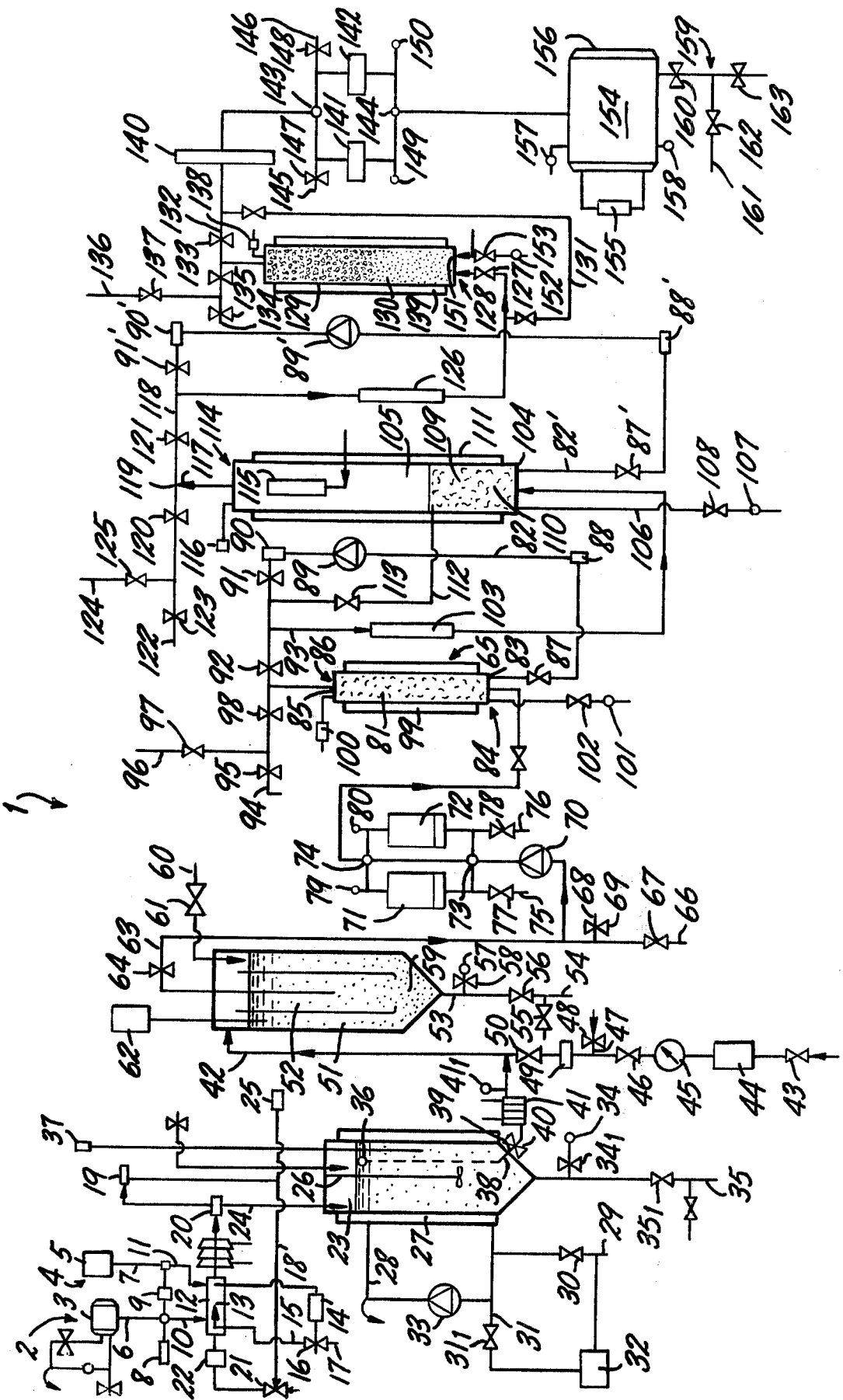

CONTINUOUS PRODUCTION OF FERMENTED LIQUIDS

The present invention relates on the one hand to a continuous process for the manufacture of a fermented liquid such as beer and, on the other hand, to an installation for the carrying out of such process.

Various processes are already known for the continuous manufacture of a fermented liquid such as beer. Thus a process is known for the continuous treatment of liquids by enzyme carriers in high concentration, which consists fundamentally in passing the liquid through an alluvion (silt) of the enzyme carriers, on at least one porous body and through the porous body itself, the size of the pores of said body being selected in such a manner that the enzyme carrier is retained practically completely on the hollow porous body, which however permits the liquid to be treated to pass through.

In accordance with this process, the liquid is conducted by hydraulic pressure through two or more porous bodies combined with an alluvion (silt) of different enzyme carriers. The operation is carried out at high temperature and in particular at temperatures greater than the optimum value known for the enzyme carrier in question. As a result, the treatment takes place by filtration.

However, this process has several drawbacks, including the fact that the enzyme carrier rapidly becomes plugged as a result of clogging of the pores by the alluviation of the enzymes. As a matter of fact, the size of an enzymatic complex such as a yeast cell for instance is of the order of 3 to 20 microns and due to the fact that these enzymes must be retained by the porous body the pores of said body necessarily have a diameter of less than 3 microns. Therefore, the passage of the liquid through the porous body is greatly retarded and the pores rapidly become plugged.

In accordance with other processes heat exchangers are used. However, the use of heat exchangers has up to now caused many difficulties. As a matter of fact, the media become laden and one rapidly arrives at a complete clogging of the system due to the depositing of the precipitates on the very hot walls of the exchanger.

A process for the treatment of brewery wort is also known in which the stabilizing or denaturizing can be effected conveniently at a temperature capable of assuring sterilization and also supplying the conditions suitable for the extraction of the substances from the hops which produce the bitterness. In accordance with this process, the mild or hopped wort is caused to stay in one or more receptacles and this wort is heated solely by injecting heated steam into the mass of liquid in such a manner that the stabilizing of the wort, which comprises a denaturing of the proteins and reactions between the proteins and the tannin in order to coagulate the degradation products of the wort, takes place before the treated wort then comes into contact with heated surfaces on which the said products could deposit, thereby causing clogging. The injected heating vapor is formed, in whole or in part, of vapor and particularly of steam, which is produced by the boiling of the wort. The stabilizing of the wort is effected before the or each hops stage or hops extraction stage.

However, this process is limited solely to the treatment of brewery wort for the obtaining of protein precipitation upon brewing. Due to the injection of vapor (steam), one can obtain a sterilization which is limited strictly to the wort, but which cannot be applied to the entire process for the manufacture of a fermented liquid, particularly when said fermentation takes place continuously.

There is also known a process in which steam is introduced into the hops and the wort. For this purpose fresh hops are used and the injection of the steam has no other purpose than the extraction and polymerization of the isohumulones, but in no way to sterilize this product. Likewise, the injection of steam into the wort has the purpose of vaporizing the wort, favoring a better extraction of the isohumulones from the raw material consisting of the hops.

The present invention clearly differs from this known process. As a matter of fact, the process is limited solely to a treatment of the wort, but it cannot be applied to the entire fermentation line. Furthermore, in accordance with this known process, fresh hops are used, while in the process of the present invention, a concentrate is employed of the hops extract which, at the time of its introduction into the manufacturing line, has already undergone either a partial or a total treatment for the extraction and polymerization of the isohumulones. Moreover, the known process does not concern a sterilization of all of the components and does not have the purpose of producing a continuously sterile medium in the installation. This sterilization must be absolutely permanent due to the continuous fermentation of the liquid in the present invention.

There is also known a system of fermentation vats for the manufacture of the sterilized beer consisting of the combination of two similar airtight vats communicating at their upper part by means of a pipe and at their lower part with each other and with a yeast receptacle via a pipe with three-way valves, in such a manner that the wort to be treated can be transferred from one to the other and wort also sent into the receptacle for diluting the yeast and sending it into the vat where the tumultuous fermentation is to take place, the other vat being intended for the yeast fermentation, this latter vat receiving the gasses liberated in the other vat via a pipe which extends down to the bottom so as to compel these gasses to bubble in the wort. The transfers of liquid are effected by the sterilized compressed air distributed by conduits provided for this purpose.

However, in order to obtain a continuous fermentation it is necessary to double the installation. For this purpose two vats are used. During the fermentation carried out in one vat the other vat is cleaned. It is necessary to transfer the wort from one vat to the other. The plurality of vats results in a considerable increase in the installation expenses and cost price. It may be considered that for each vat the fermentation is not continuous but batch-wise.

There is also known a treatment of the amylaceous materials for the manufacture of alcohols, yeasts, beers, liquors, glucoses, and the like by mucidenes and other ferments comprising as a whole a prior steeping, a boiling under pressure, a refrigerating of the wort, a saccharification, a yeast development, a fermentation and a distillation.

However, only a part of the manufacture of the fermented liquid is subjected to a continuous treatment, while the fermentation part is carried out batch-wise. The essential problem is to provide a sterile-medium manufacturing line of the fermented liquid when continuously treating the wort at the level of the fermentation.

Likewise, a process is known for the continuous manufacture of beer wort in which malt and brewing water are combined to form a mash and the mash is heated by steps to certain temperatures of rest corresponding to the mashing temperature, the mash being then separated into "draff" and wort, the wort being brought to boiling, cooled, and the "breaks" being eliminated. In accordance with this process, the entire brewing water necessary is introduced into the production circuit at a single stage of the process, namely upon the steeping.

However, this process concerns only the manufacture of the wort. The present invention refers to the manufacture of beer from the wort extract and the manufacture of the wort is merely one phase of manufacture proceding the process of the invention.

The object of the present invention is to overcome these drawbacks and is directed at providing a process for the continuous manufacture of a fermented liquid which operates with a selected strain of yeast fixed on a column and an installation operating under strictly aseptic conditions in which there is used a wort sterilized before its injection into the system which, an improvement in the quality of the wort entering into the fermentation makes it possible to improve the quality of the beer.

For this purpose the invention concerns a process for the continuous manufacture of a fermented liquid characterized by the fact that on the one hand all the components participating in the manufacture of this fermented liquid are sterilized continuously before their introduction into the manufacturing line for the fermented liquid and that on the other hand all the equipment permitting the different phases of boiling of the wort, treatment of the wort, barreling of the wort, fermentation, storage, treatment of the fermented liquid and filtration are designed to guarantee the installation against any introduction of foreign microorganisms and to offer a permanently sterile medium.

The continuous process of manufacture of a fermented liquid is characterized also by the fact that the yeast used for the fermentation and the storage of the fermented liquid is produced by enzymes which are also fixed on another support which is inert with respect to the fermentation medium. This permits the cell multiplication necessary for the production of volatile substances which contribute to the aroma and the taste of the beer and also assure operation for several months.

The invention also concerns an installation composed of at least one sterilization chamber for the concentrated wort and bitter substances, a boiler for the boiling of the wort, a separator for the precipitate, a fermentation tower, a storage tower, a treatment tower, a storage tank and a bottling unit characterized by the fact that the sterilization chamber for the concentration wort and bitter substances, the boiler, the separator, the fermentation tower, the storage tower, the treatment tower, the storage tank and the tapping unit comprise sterilization means for permanently doing away with any presence of foreign microorganisms in the installation.

The invention will be better understood by reference to the following description given by way of illustration and not of limitation and to the sole FIGURE containing a diagram of the nature and embodiment of the different stages constituting the installation permitting the carrying out of the process of the invention for the continuous manufacture of a fermented liquid such as beer.

The installation 1 shown in the diagram comprises a first tank 2 containing the concentrated wort 3 and a second tank 4 containing the bitter substances 5. Each tank 2, 4 is connected by a conduit 6, 7 to a metering pump 8, 9 which injects the components, namely the concentrated wort and the bitter substances through the conduits 10, 11 into a sterilization chamber 12. This sterilization chamber 12 brings these products to a temperature of between 100° and 170° C for a period of time of between 3 seconds and 30 minutes. Furthermore, the arrangement of this chamber 12 is also such that the components are maintained in a constant ratio. By means of this chamber 12 a flash sterilization and a homogenization of the components of the medium are obtained. This chamber 12 comprises a steam injector 13 and a regulator 14 arranged on a circuit 15 which make it possible to control the admission of steam in order to reach the desired temperature. A valve 16 is arranged on the steam feed circuit 17. However, the variable amount of water contributed by the steam results in a variation in the concentration of the medium. Compensation is effected by a regulating loop 18 formed of a regulator 19 coupled to a weight flow meter 20 which acts on a valve 21 in order to cause a proportional admission of cold water into the chamber 12. This regulating loop 18 comprises a filter 22 between the valve 21 and the chamber 12.

This sterilization chamber 12 makes it possible to study the effect of the flash sterilization for a very short period of time at elevated temperatures, on the composition of the medium. Therefore, the quality of the wort entering into fermentation can be improved.

The wort sterilized by injection of steam is directed from the chamber 12 towards a boiler 23 through a conduit 24. On this conduit 24 there is connected a pressure regulator 25 for the admission of the wort. The boiler 23 provided with an agitator 26, comprises a jacket 27 connected to a circuit 28. This circuit 28 comprises a cold water feed 29 provided with a valve 30, a steem feed 31 provided with a valve $31_1$, a circulating pump 33 and a regulator 32. The purpose of this boiler 23 is to complete the transformation of the bitter substances incorporated in the wort and to study the comparative effect of the temperature and the length of the boiling on the quality of the wort. At its lower part the boiler has a purge 34 provided with a shut-off valve $34_1$. This purge 34 is connected to a steam circuit 35 provided with a valve $35_1$ which makes it possible to proceed with a flushing by steam of the said purge 24 in order to maintain the sterilization upon the emptying of the charge of precipitate.

For this broiler 23 one can contemplate various types of operations, including:

automatic sequential operation: rapid filling of the boiler 23 via the chamber 12 followed by a longer or shorter time of boiling. The temperature and the time of boiling are related. The wort passes automatically into a subsequent separating stage 51, the discharge of the precipitate from the boiler 23 taking place at a low point;

continuous operation: the chamber 12 feeds the boiler 23 which is maintained at a selected temperature with such a rate of flow that the average time of stay of the wort permits correct sterilization and boiling. The discharge from the boiler 23 takes place at a high point 36 such as shown in the sole FIGURE of the drawing.

Of course the boiler 23 is provided with a "high and low" level detector 37.

The outlet 38 of the boiler 23 is connected, via a conduit 39 having a valve 40, to an exchanger 41 and a purge $41_1$. The exchanger 41 makes it possible to re-cool the wort. At the outlet from the exchanger 41, the conduit 39 is connected to a conduit 42 which assures the contribution of compressed air or oxygen. This conduit 42 comprises in succession a first valve 43, a flow regulator 44, a flow meter 45, a second valve 46, a steam feed tap 47 provided with a valve 48 permitting sterilization of the compressed air or oxygen, a filter 49 and a third valve 50. This conduit 42 or "monte jus" acting via the injection of sterile air or oxygen, permits at the same time the feeding of a separator 51 and the aeration of the wort.

The separator 51 permits the decantation of the precipitates formed upon the boiling of the wort. An inner guide cylinder 52 imparts a direction of flow to the wort which favors the separation. A purge 53 arranged at the lower part of the separator 51 comprises a steam inlet 54 provided with a valve 55, a valve 56 and a purge 57 provided with its valve 58. This purge 53, which is sterile under steam, makes it possible automatically and sequentially to eliminate the precipitates 59 which have accumulated at the bottom of the separator 51. The latter also comprises, at its upper part, a steam inlet 60 provided with a valve 61. A level detector with a capacitative probe 62 makes it possible to note at any moment the reserve contained in the separator 51. In the automatic sequential manner of operation, two thresholds (low and high levels) make it possible to start and stop the operation of the sterilizer-boiler module.

Via a conduit 63, provided with a valve 64, the finished wort is transferred before fermentation from the separator 51 to a fermentation tower 65. This conduit comprises a sterile purge 66 with its valve 67 which is connected for this purpose to a steam inlet 68 provided with a valve 69. The conduit 63 directs the wort towards a metering pump which may or may not be connected to a filter battery. This battery comprises at least two filters 71, 72 which may be placed in operation alternatively by means of two three-way valves 73, 74 placed upstream and downstream of the two filters 71, 72 respectively. These filters 71, 72 which are intended to eliminate the rest of the precipitates which have escaped the successive decantations, are sterilized on the spot after replacement of the cartridges. For this purpose a steam inlet 75, 76 provided with its valve 77, 78 is provided upstream for each filter 71, 72 and a purge 79, 80 is provided downstream.

The fermentation tower 65 is a fermenter of the homogeneous or heterogeneous type that yeast is in liquid medium or immobilized on a support 81 which is inert with respect to the fermentation. This support 81 may be formed either of diatoms, that is to say microscopic shells of fossil infusoria, mixed with yeast, or polyvinyl chloride in granules mixed with yeast, or diatoms, of polyvinyl chloride or other feed plastics and yeast. In the case of this inert support 81, there is employed a fixing circuit which is traversed by the suspension of yeast which, in connective contact with the support 81, is retained by physical-chemical bonds. As a result of repetition of passages of the yeast there takes place, not a filtration, but an adsorption on the support 81 permitting a relatively large heterogeneous particle size of the order of several millimeters. In this way a clogging of the support 81 by an alluviation in avoided. In order to effect this circulation, a conduit 82 is provided the outlet 83 of which is located at the base 84 of the fermentation tower 65 and the inlet 85 at the upper portion 86 of this tower. This conduit 82, which makes it possible to fix the yeast by recycling on the adsorbent support 81 upon the placing in operation of the fermentation tower 65 comprises in succession a first valve 87 connected to the outlet 83, a first sterile steam coupling 88 for the outside contribution of yeast and sterile condition, a peristaltic pump 89, a second sterile steam connection 90 for a second outside contribution of yeast and sterile conditions and two valves 91, 92 located on opposite sides of the beer outlet conduit 93, the valve 92 being connected to the inlet 85.

A sterile sampling conduit 94 is provided composed in succession of a first valve 95, a steam feed conduit 96 provided with its valve 97, and a second valve 98.

The temperature of the fermentation tower 65 is regulated by a flow of thermostatted water in a jacket 99 by means of a regulator (not shown). The fermentation tower 65 is provided with a valve 100 and a purge 101 with its valve 102.

Within the fermentation tower 65, a certain proliferation of the yeast cells is favored by controlling the initial composition of the wort coming from the sterilization chamber 12 and the boiler 23 on the flow of the metering pump 70 feeding the fermentation tower 65. Under these conditions, the beer obtained has a composition in volatile products which is very close to a conventional beer, as shown by the following table:

| Volatile Products | Continuous beer | Conventional beer |
|---|---|---|
| Ethyl acetate | 22.4 mg/l | 22 to 33 mg/l |
| Isobutyl acetate | 0.1 | 0.08 to 0.10 |
| Propanol | 42.4 | 5 to 45 |
| Isobutanol | 34.8 | 25 to 40 |
| Isoamyl acetate | 0.8 | 2.0 to 3.0 |
| Isoamyl alcohol | 87.3 | 75 to 100 |
| Ethyl caproate | 0.2 | 0.07 to 0.2 |
| Ethyl carpylate | 1.2 | 0.2 to 1.0 |
| Caproic acid + phenylethyl acetate | 3.2 | 3 to 10 |
| β phenylethanol | 18.2 | 20 to 40 |
| Carpylic acid | 3.3 | 2 to 4 |
| Capric acid | 0.7 | 0.3 to 1.0 |
| Total volatile products Σ | 214.6 | |
| Diacetyl | Traces | 0.05 to 0.15 |
| 2-3 pentane dione | 0 | 0 |

It is well known, as a matter of fact, that a large part of the volatile substances present in a beer come from the metabolism of the amino acids utilized by the beer cells in order to multiply. If there were not this multiplication of cells, the final product emerging from the fermentation tower 65 would be different.

The beer outlet conduit 93 comprises a heat exchanger 103 which makes it possible to bring the beer to a temperature of 0° to 30° C. This conduit is connected to the base 104 of a storage tower 105. At the base 104 of this storage tower 105 there is provided an inert support feed conduit 106 provided with a purge 107 having its valve 108. This purge 107 is steam-sterile. The beer emerging from the fermentation tower 65 can be cooled to a temperature of 0° to 30° C and passes into the storage tower 105, the lower portion 109 of which is provided with a support 110 which is inert with respect to the fermentation. This inert support 110 of the storage tower 105 may be identical to the inert support 81 of the fermentation tower 65 and may be formed either of diatoms and yeast or of polyvinyl chloride and yeast or of diatoms, yeast and polyvinyl chloride or other plastics useful for foods. The temperature of the storage tower 105 is maintained by a jacket 111 between −1.5° and +30° C. Recycling of the beer is provided and for this purpose the storage tower 105 is provided with a circulation conduit 112 on which a valve 113 is arranged. This circulation conduit 112 is connected to the beer outlet conduit 93 and is connected between the two valves 91, 92.

The storage tower 105 can be equipped with a fixing circuit traversed by the suspension of yeast identical to the fixing circuit traversed by the suspension of yeast of the fermentation tower 65. This circuit comprises a conduit 82' the outlet of which is located at the base of the storage tower 105 and the inlet at the upper part of this same tower. This conduit 82' is provided with a first valve 87', a first steam-sterile connection 88' for the external contribution of yeast in sterile condition, a peristaltic pump 89', a second steam-sterile connection 90' for a second external contribution of yeast under sterile conditions and a valve 91'.

In order to saturate the beer, a porous plug 115 is provided in the upper portion 114 of the storage tower 105. The storage tower 105 is provided with a valve 116 and has an outlet conduit 117 connected to a second conduit 118 by a tap 119. On the two sides of the tap 119 there are arranged valves 120, 121, the latter being connected to the valve 91'. A sterile sampling conduit 122 is provided connected to the valve 120 and composed of a valve 123, a steam feed conduit 124 and a valve 125. The beer flowing in the conduit 118 and coming from the storage tower 105 passes through a heat exchanger 126 in which the temperature can be adjusted between 0° and 60° C. Behind the heat exchanger 126, the conduit 118 which has a valve 127 is connected to the lower portion 128 of a treatment tower 129. This treatment tower 129 is provided with a support of natural or synthetic organic polymers, brick, silica, glass, sand, compounds having a base of silica, in particular halogenated silicas and amino silicas, previously activated clay materials mixed with a protease 130 and the beer passes into said treatment tower 129 on which proteases are fixed, such as papain, pepsin, chymotrypsin, ficin, bromelin and others.

The liquid flows through the treatment tower 129 and the proteases are retained by physical-chemical bonds.

The storage tower 105 and the treatment tower 129 are for the purpose of reducing the amount of diacetyl, decreasing the quantity of sulfur compounds, and improving the organoleptic quality of the product.

On the conduit 118 there are provided one or more feed conduits 131 through which different compounds are injected into the beer, namely:

reducing agents such as sulfurous anhydride, potassium or sodium metabisulfite or sodium isoascorbate, ascorbic acid and the like;

sterilizing agents, particularly bacteriostatic agents;

coloring substances coming from solutions of sugars or malt coloring substances;

bitter compounds: addition of compounds such as iso- $\alpha$ -acids or derivatives.

The compounds can be injected either into the feed conduit 118 or into the outlet conduit 132 of the treatment tower 129. The outlet conduit 132 which is provided with a valve 133 has a sterile sampling conduit 134 composed of a valve 135, a steam feed conduit 136 and valve 137. The beer contained in the treatment tower 129 which has a valve 138 at its upper part can be maintained at a given temperature by means of a thermostatted liquid flowing in a jacket 139 surrounding the treatment tower 129. The beer coming from the treatment tower 129 and circulating in the outlet conduit 132 can be flash pasteurized by means of a heat exchanger 140. The beer conduit 132 can comprise a battery of at least two filters 141, 142 which may be placed in operation alternatively by means of two three-way valves 143, 144 located upstream and downstream respectively and each filter 141, 142 of which has upstream a stream inlet 145, 146 provided with its valve 147, 148 and downstream a purge 149, 150 which makes it possible to eliminate any yeasts which may have been entrained. The treatment tower 129 has a conduit 151 for the feeding of brick or other supports mixed with the protease, this conduit being provided with a purge 152 provided with its valve 153.

The beer is stored in a storage tank 154 which is cooled by means of a refrigerating unit 155 feeding a jacket 156. This storage tank 154 has a calibratable valve 157 for maintaining the pressure of the carbon dioxide and a sterile purge 158. On this storage tank 154 there is connected a sterile tapping assembly 159 provided with a first valve 160, a steam feed tap 161 provided with its valve 162 and a second valve 163.

Although the invention has been described with reference to a specific embodiment, it will be understood that it is by no means limited hereto and that various changes in form, materials and combinations of these various elements can be made therein without thereby going beyond the scope of the invention.

We claim:

1. A process for the continuous production of a fermented liquid wherein all constituents participating in said production are sterilized prior to being introduced into said process comprising the steps of flash sterilizing a mixture of wort and bitter substances by direct injection of steam into said mixture, boiling said mixture so as to complete the transformation of the bitter substances incorporated in said wort, decanting the precipitates formed in said wort under aeration of said wort by sterile compressed air or oxygen, fermenting said wort by bringing said wort into contact with yeast fed from an external supply in sterile condition, said yeast being fixed on an inert support by physical-chemical bonds, storing the fermented wort in the presence of yeast under sterile conditions and passing said fermented wort through a treatment zone in contact wit sterile protease fixed on a support, all steps of said process being carried out in zones provided with means for avoiding the introduction of foreign microorganism therein so that a permanently sterile medium is provided throughout said process.

2. A process according to claim 1 wherein said mixture of wort and bitter substances are sterilized by direct injection of steam for a period of time of the order of 3 seconds to 30 minutes and at elevated temperatures of the order of 100° to 170° C.

3. Process according to claim 1 wherein said injection of sterile compressed air or oxygen simultaneously effects the feeding of said wort to a decanting zone and the aeration of said wort.

4. A process as claimed in claim 1 wherein said yeast are fixed on said support by circulating a suspension of said yeast in a sterile fixing circuit including said inert support to cause adsorption of the yeast on said support and the retention of said yeast on said support by physical-chemical bonds.

5. A process according to claim 4 wherein said inert support is selected from a member of the group consisting of diatoms, polyvinyl chloride and plastic useful for food other than polyvinyl chloride.

6. A process as claimed in claim 1 wherein the fermented wort during storage is contacted with yeast fixed on an inert support by physical-chemical bonds and the process further comprises the step of circulating a suspension of yeast in a sterile fixing circuit including said support to cause adsorption of the yeast on said support and the retention of the yeast on said support by physical chemical bonds.

7. A process according to claim 6 wherein said inert support is selected from a member of the group consisting of diatoms, polyvinyl chloride and plastic useful for food other than polyvinyl chloride.

8. A process according to claim 1 wherein in the steps of fermenting said wort and storing said fermented wort, said yeast are fixed by physical-chemical bonds to an inert support in granular form selected from a member of the group consisting of diatoms, polyvinyl chloride and plastic useful for food other than polyvinyl chloride.

9. A process as claimed in claim 1 wherein the support on which said protease is fixed is selected from a member of the group consisting of brick, silica, halogenated silica, and amino silica and said protease is selected from at least one member of the group consisting of papain, pepsin, chymotrypsin, ficin and bromelin.

10. A process for the continuous manufacture of a fermented liquid, using a sterile wort comprising the steps of
flash sterilizing a mixture of concentrated wort and bitter substances by direct injection of steam in a sterilization zone,
transferring said mixture to a boiler and boiling said mixture to complete the transformation of said bitter substances in said mixture,
removing said mixture from said boiler,
injecting sterile air or oxygen into said mixture in order to effect the transfer of said mixture into a separator and to aerate said mixture,
decanting and removing precipitate formed in said mixture from said separator,
feeding said mixture thus freed of said precipitate into a fermentation zone into contact with yeast fed from an external supply in sterile condition, said yeast being fixed on an inert support by physical-chemical bonds,
tranferring the thus-fermented mixture into a storage zone where said mixture is stored in the presence of yeast fixed on an inert support and then
passing said mixture through a treatment zone into contact with sterile protease fixed on a support, each of said steps being carried out under sterile condition.

11. A process according to claim 10 which comprises the further step of fixing the yeast to be fed into said fermentation zone on a support by circulating a suspension of said yeast in contact with said inert support in a fixing circuit, whereby said yeast are adsorbed on said support and retained therein by physical-chemical bonds.

12. A process according to claim 10 which comprises the further step of fixing the yeast present in said storage zone to an inert support by circulating a suspension of said yeast in contact with said support in a fixing circuit, whereby said yeast are adsorbed on said support and retained therein by physical chemical bonds.

13. A process according to claim 10 in which said process is for the continuous manufacture of beer and wherein the composition of said mixture transferred from said sterilization zone, removed from said boiler and fed to said fermentation zone is controlled to favor proliferation of said yeast cells in said fermentation zone, thereby increasing the amount of volatile substances in said beer.

* * * * *